United States Patent [19]

Foch et al.

[11] 4,330,819

[45] May 18, 1982

[54] STATIC SEMI CONDUCTOR ELECTRICAL ENERGY CONVERTER

[75] Inventors: Henri Foch; Jacques Roux, both of Toulouse, France

[73] Assignee: Agence Nationale de Valorisation de la Recherche, Neuilly sur Seine, France

[21] Appl. No.: 93,106

[22] Filed: Nov. 13, 1979

[30] Foreign Application Priority Data

Nov. 13, 1978 [FR] France .................. 78 32428

[51] Int. Cl.³ .......................... H02M 7/537
[52] U.S. Cl. ................... 363/132; 307/248; 363/98
[58] Field of Search ............ 363/16, 17, 20, 21, 363/56, 98, 132; 307/248; 361/89; 323/289

[56] References Cited

U.S. PATENT DOCUMENTS 3,027,508  3/1962  Johnson .
3,490,028  1/1970  Modiano .................. 363/17
3,729,655  4/1973  Gratzke ................... 363/56
4,095,128  6/1978  Tanigaki .

FOREIGN PATENT DOCUMENTS 609813  3/1979  Switzerland ............. 363/56

570171  10/1977  U.S.S.R. ..................... 363/132

OTHER PUBLICATIONS

New Electronics, (GB), vol. 10, No. 17, pp. 60, 63, Sep. 6, 1977.

Primary Examiner—William H. Beha, Jr.
Attorney, Agent, or Firm—Sandler & Greenblum

[57] ABSTRACT

The invention relates to a static semi-conductor electrical energy converter.

The converter is of the type comprising a power stage 5 provided with at least one power transistor 7, and a control stage 1 furnishing a control signal $S_C$ appropriate for the conversion to be carried out; according to the invention, each transistor is a transistor having a voltage $V_{CEX}$ greater than its voltage $V_{CEO}$ and is associated with an intermediate stage 4 for treatment of the control signal $S_C$. This stage 4 is adapted to drive the base of the said transistor to guarantee operation thereof over a voltage range extending from 0 to $V_{CEX}$ thus making it possible to take advantage of the improved voltage $V_{CEX}$ of the said transistor.

The invention is applicable in particular in the case of inverters adapted to convert a continuous electric voltage into an alternating electric voltage.

9 Claims, 11 Drawing Figures

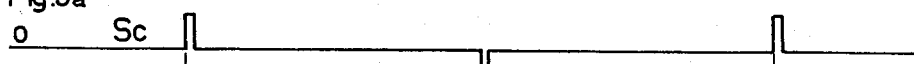
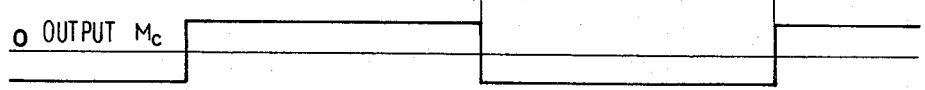
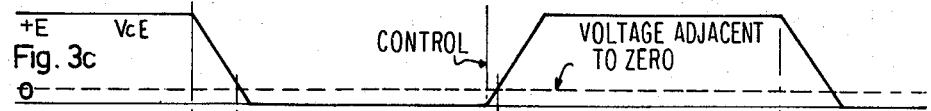
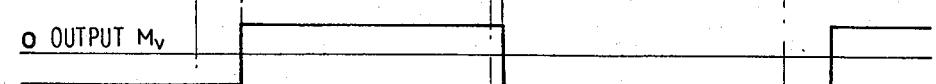
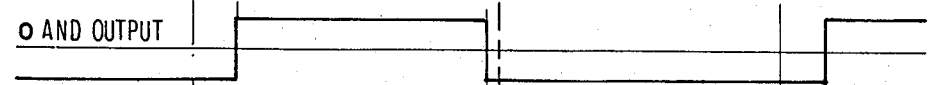
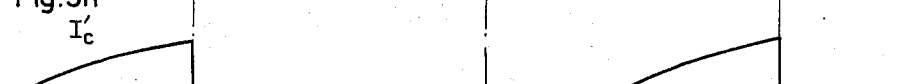
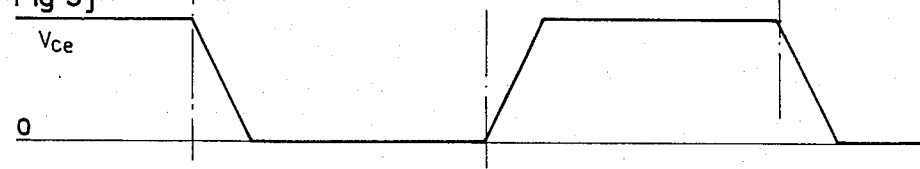

STATIC SEMI CONDUCTOR ELECTRICAL ENERGY CONVERTER

The invention relates to a semi-conductor electrical energy static converter; it finds particular application in the case of a converter, called an inverter, adapted to convert a continuous electrical voltage into an alternating electrical voltage of predetermined frequency.

Presently, essentially two types of semi-conductor static converter technologies are known: the thyristor converters and the power transistors. The first require auxiliary switching systems which are complex and costly, and for this reason have a tendency to be used less than the second.

The invention relates to converters of the second type, having power transistors.

The converters of this second type presently known have however performances at voltages limited by those of the power transistors utilized. In effect, by virtue of the very nature of the switching mechanisms utilized, these known transistor converters are tributaries of the voltage $V_{CEO}$ reverse (collector-emitter voltage, open base) of the transistors: this voltage $V_{CEO}$ is relatively small, and is insufficient to allow for their use use in numerous industrial applications. For example, the presently known power transistors which are of the highest performance, have voltage $V_{CEO}$ on the order of 400 volts, which makes it possible to utilize them for voltages up to 220 volts rectified but prevents their use for normal industrial voltages of 380 volts rectified which require a loading $V_{CEO}$ at least equal to 700 volts to take the necessary security measures into account.

The present invention attempts to overcome the above limitation by providing a power transistor converter, of novel structure making it possible for it to be used over a considerably broadened voltage range without a reduction in its current performances.

In particular an object of the invention is to provide a converter which may be used for industrial voltages of 380 volts rectified.

Another objective of the invention is to provide a converter which benefits both from particular simplification of circuits, and from an increase in the mass power reaching double (the mass power being defined as the power converted by a mass unit of the circuits).

Another objective is to reduce, at equal converted power, the energy losses in the converter.

Another objective, related to the reduction of energy losses, is to extend the available frequency range of the converter.

To this end, the static converter provided by the invention is of the type comprising:

- a power stage provided, on the one hand, with at least one power transistor having a driven base to assure the desired conversion at the level of the collector/emiter, on the other hand, with a commutation circuit associated with each transistor to steer away its collector current in the course of blocking commutations of the said transitor;
- a control stage adapted to cause, for each power transitor, a control signal SC of appropriate form for the conversion to be performed.

According to the present invention, each power transistor is a transistor having a voltage $V_{CEX}$ (collector-emitter voltage at no collector current and base polarized negatively) greater than its bias voltage $V_{CEO}$ (collector-emitter voltage, base open); furthermore, the converter comprises, associated with each power transistor, an intermediate treatment stage control signal $S_C$ of the said transistor, this intermediate stage having an input connected to the control stage to receive the signal $S_C$, another input connected to the power stage to detect the collector/emitter voltage $V_{CEO}$ of the power transistor considered, and an output connected to the said power stage to trigger the commutations of the power transistor, the said intermediate stage being adapted to drive the base of the said power transistor in a fashion so as to render this transistor conductive in the single case where, at once, the control signal SC has a value corresponding to placing the transistor into conduction and the voltage $V_{CE}$ of the said transistor is adjacent to zero.

The static converter according to the invention is applicable for any inductive load, which represents the vast majority of industrial applications; in a more general fashion, it can be applied to loads such that each transistor of the converter is effectively conductive when the blockage order concerning the said transistor is delivered via the control signal $S_C$.

In the converter according to the invention, it is the voltage $V_{CEX}$ of the power transistors which is exploited, by virtue of the presence and of the original disposition of the intermediate treatment stage, which makes it possible to utilize the properties of certain high transmission transistors which have a voltage $V_{CEX}$ substantially higher than their voltage $V_{CEO}$. It is in particular the case with transistors known as "reverse-Mesa" whose $V_{CEX}$ voltage (850 Volts presently for the most powerful) is substantially equal to the double of their $V_{CEO}$ voltage (400 Volts). Furthermore, it is known that the elevated value of this $V_{CEX}$ voltage is not accompanied by a reduction of the current intensities which the transistor is adapted to tolerate; under these conditions, one obtains not only an increase in the range of available voltages, but further a simultaneous increase in converter powers.

The intermediate treatment stage takes into account, on the one hand, the conventional control signal, on the other hand, downstream, the voltage conditions at the power transistor terminals considered; such that, this stage provides a base feed of the transistor which guarantees thereto operation over a range of voltages extending from zero to $V_{CEX}$, thereby making it possible to benefit from this improved voltage.

It should be noted that by "power transistor" a discrete transistor as well as a composite transistor, formed by a conventional association of transistors in parallel and/or Darlington transistors is intended.

According to a preferred embodiment leading to a very simple electrical layout of the converter, each intermediate treatment stage associated with a power transistor comprises:

- a shaper circuit $M_V$ of the voltage $V_{CF}$ of the said transistor, adapted to furnish a signal of two states, one corresponding to a voltage $V_{CE}$ adjacent to zero, the other at a different voltage,
- a shaper circuit $M_C$ of the control signal SC adapted to furnish a signal having two states, one corresponding to the conduction values, the other to the blockage values of this control signal,
- a logic unit connected to the two circuits $M_V$ and $M_C$ referred to above and adapted to form an AND function with respect to the output signals of these circuits so as to furnish a two state logic switching signal; and an adaptation circuit A connected to the AND logic gate and to the base of the power transistor being considered, this adaptation circuit being adapted to furnish a feed current of the said base as a function of the output signal of the AND logic gate.

As will be understood better below, such a design of intermediate treatment stages makes it possible to achieve novel necessary functions by virtue of a simple original connection of electronic components of which the majority are already present in conventional converter circuits.

Furthermore, each commutation assistance circuit referred to above can be of the conventional type, such as those already equipping known converters; however, the design of the converter according to the invention has the considerable advantage of making it possible to simplify in particular these commutation assistance circuits.

To this end, according to one preferred embodiment, each commutation assistance circuit, associated with each power transistor, comprises a condenser connected in parallel across the collector and emitter of the said power transistor so as to steer the collector current therefrom in the course of blocking commutations.

In conventional converters, the startup of power transistors are assured in the absence of the intermediate treatment stage, which necessitates complex commutation assistance circuits comprising in particular, for each transistor, besides the condenser referred to above, an induction voltage buffer, two insulation diodes, and two power resistors to dissipate the commutation energies. On the contrary, in the invention, by virtue of the original drive provided for each power transistor by its intermediate treatment stage, the associated commutation assistance circuit can be reduced to a single condenser.

There flows therefrom not only significant simplification of the converter schematic in its entirety, but furthermore and most importantly, a considerable reduction (on the order of 75%) of energy losses because one eliminates the startup losses in the transistor, as well as the losses in the resistors and diodes.

This advantage, essential from the point of view of the improvement of the efficiency which it brings, has an indirect equally favorable consequence: it makes it possible to increase the range of frequencies available via the converter; in effect, the losses for each commutation being very reduced, it is possible to increase the frequency of these commutations while maintaining satisfactory overall efficiency.

The converters are generally mounted in symmetrical structure for reasons of symmetry, the negative and positive alternations of the alternating voltage with respect to the continuous voltage. In numerous applications the converter according to the invention will be mounted in symmetrical structure with an even number of power transistors, associated by pairs; the two transistors of one pair will be connected at half-bridge to the terminals of a power supply, the base of each transistor being connected to the corresponding intermediate stage.

The converter can for example be of the inverter type, adapted to convert a continuous electric voltage into an alternating voltage of a predetermined frequency F; the control stage is thus adapted to cause for each power transistor, a control signal $S_C$ alternating in frequency equal to F.

The description which follows, with reference to the annexed drawings, illustrates by way of non-limiting example one embodiment of the invention; in these drawings which form an integral portion of the present description:

FIGS. 3a, 3b, 3c, 3d, 3e, 3f, 3g, 3h and 3j are time diagrams showing the forms of the principal signals produced in the converter.

Figure 1:
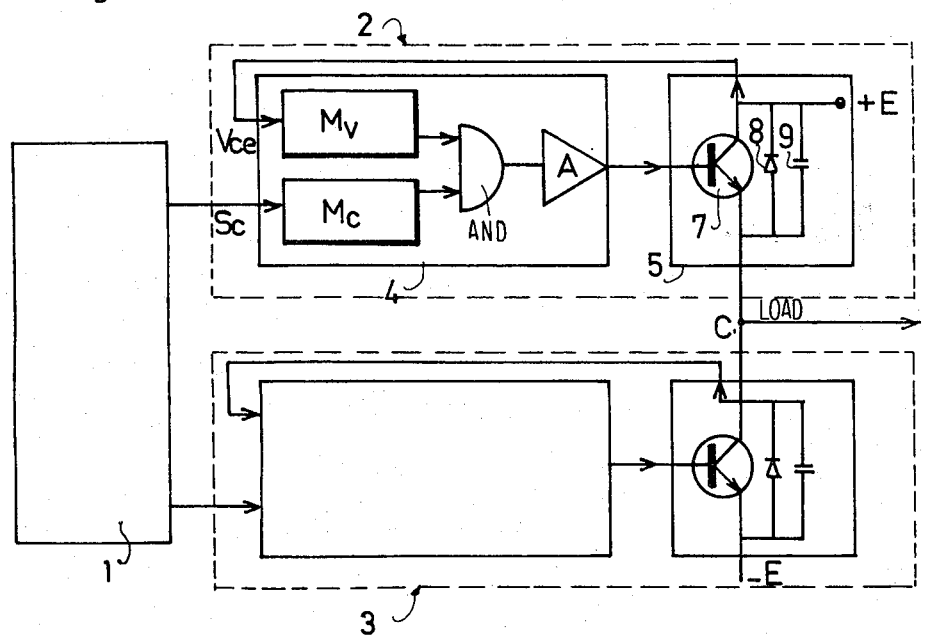
FIG. 1 is a block schematic diagram illustrating the general arrangement of this embodiment.
Figure 2:
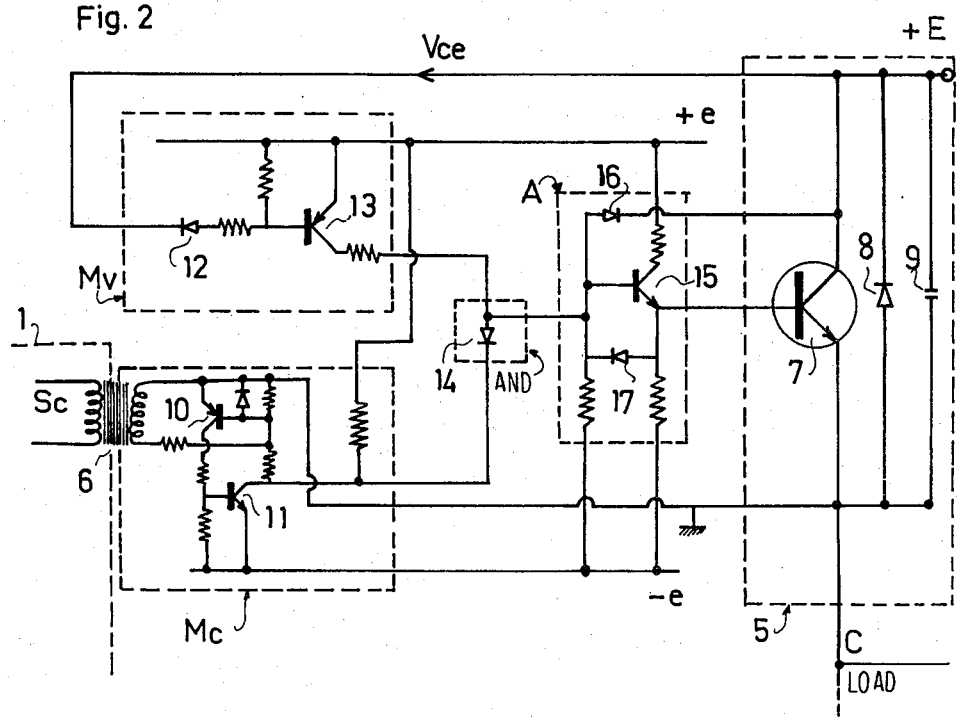
FIG. 2 is a partial electronic schematic in greater detail.

The converter shown by way of example in FIGS. 1 and 2 is a single-phase half-bridge inverter comprising a control stage 1 common to the two parallel identical channels 2 and 3 which each comprise an intermediate treatment stage 4 and a power stage 5.

The load is connected, on the one hand, to a point C common to the two power stages, on the other hand to a middle point of a power supply. This load can be of any cos α AR (inductive load) type: transformer loaded by a rectifier, power filter, single-phase machine, etc.

The control stage 1 is of the known type, adapted to furnish, by interposition of an isolation transformer 6, a control signal $S_C$ to each of channels 2 and 3. In the example, this signal $S_C$ occurs in the form of pulse series such as are shown in FIG. 3a, having a frequency F equal to that of the alternating voltage to be obtained.

Each power stage comprises a "reverse Mesa" power transistor such as 7, a conventional energy recovery diode 8, and a commutation assistance circuit formed by a condenser 9 arranged in parallel, as is the diode, between the emitter and the collector of the transistor 7.

Each intermediate treatment stage 4 comprises a circuit $M_C$ for shaping the control signal $S_C$ delivered by the control stage 1, in circuit $M_V$ for shaping the collector/emitter voltage $V_{CE}$ of the power transistor 7, an AND logic gate at the output of the two preceding circuits, and an adaptation circuit A receiving the signal issuing from this gate and adapted to feed the base of the power transistor 7.

The circuit $M_C$ comprises two transistors 10 and 11 forming a bi-stable circuit adapted to switch from one state to another under the effect of each pulse of the signal $S_C$. An example of the schematic of this circuit is shown in FIG. 2 and an example of the signal issuing therefrom is given in FIG. 3b.

The circuit $M_V$ senses the voltage $V_{CE}$ (Fig. 3c) of the power transistor 7 by means of a high voltage diode 12 connected to the collector of the power transistor; this circuit $M_V$ comprises a transistor 13 which functions as a comparator element between, on the one hand, a reference voltage furnished by low power feed means, on the other hand, the voltage $V_{CE}$ referred to above.

The low power feed means are adapted to provide a very low +e voltage called the voltage adjacent to zero, with respect to the voltage E of the power supply; for example, this voltage +e will be on the order of 1/100th of the voltage E. This reference voltage serves equally for the low power feed of other sub-assemblies of the intermediate treatment circuit 4.

FIG. 3d gives the form of the signal having two states, issuing from the circuit $M_V$; during the time the voltage $V_{CE}$ is less than the voltage adjacent to zero, the output signal $M_V$ has a positive value; in the opposite case, it has a negative value.

The signals issuing from the circuits $M_C$ and $M_V$ are steered towards the AND logic gate; in the example this gate can be reduced to a diode 14 connected at the output of these circuits $M_C$ and $M_V$ and to the input of the adaptation circuit A. As shown in FIG. 2, this diode is connected to steer towards the circuit $M_C$ the current issuing from the circuit $M_V$ for the one of the two states of the circuit $M_C$ (negative values) and to deliver this current towards the adaptation circuit A for the other state of the said circuit $M_C$ (positive values); one thus very simply achieves an AND function and the form of the signal issuing from this gate is shown in FIG. 3e.

The adaptation circuit A comprises feed means furnishing two voltages, positive and negative; in the example the positive voltage is constituted by the reference voltage $+e$ and the negative voltage by a voltage of opposite sign $-e$.

This circuit A is essentially constituted by a self-regulating base current assembly, comprising, on the one hand, a ballast component formed in the example by a transistor 15, on the other hand, a diode 16 associated with this ballast component. The ballast component 15 receives the positive feed voltage, while the diode 16 is connected to the collector of the power transistor 7, in a fashion so as to annul the base current of the said transistor when its collector/base voltage $V_{CB}$ becomes negative.

Furthermore, the adaptation circuit A comprises a negative polarization diode 17, connected between the base of the power transistor 7 and the negative voltage $-e$ to assure a negative polarization of the base of the transistor 7 during the blockage periods of the said transistor.

In FIG. 3f, is shown the intensity of the current of the output of this adaptation circuit in the case where a collector current $I_C$ of the power transistor 7 having the form shown in FIG. 3g (case where a passive inductive load of the conventional type).

The collector current $I'_C$ of the power transistor of the symmetric channel 3 (referenced to FIG. 1) is shown in FIG. 3h; the currents $I_C$ and $I'_C$ corresponding to the positive and negative alternations of the load current. The voltage $V_{CE}$ resulting between collector and emitter of the power transistor 7 is shown in FIG. 3j.

The overall operating mechanism of the device can be summarized as follows: the control signal $S_C$ issuing from the control stage 1 takes priority at the blockage level and, across the intermediate stage 4, causes the blockage of the power transistor 7, while, in the parallel channel 3, this same signal $S_C$ does not cause the startup by virtue of the inhibition of this signal in the corresponding intermediate treatment stage; at this instant there exists in the inductive load a current which, not being able to pass into any of the power semi-conductors, traverses the condensors 9, thereby initiating the voltage transitions $V_{CF}$. It is only at the end of the transition of $V_{CE}$ that the startup of the power transistor of the parallel channel 3 takes effect.

The preceding description relates to a single-phase elementary inverter, constituted only by a half-bridge; of course, it is possible in conventional fashion to combine several half-bridges in a fashion so as to achieve a converter having 2n power transistors, adapted to the application envisioned; in particular, it is possible to provide:

four power transistors for a single-phase bridge inverter,
six transistors for a three-phase bridge inverter, combinations of the preceding solutions depending on the powers to be converted.

The converter according to the invention can be utilized in every case of continuous/alternating reversible energy conversion, in particular in the domain of fixed frequency electric feeds (particularly feeds for emergency and/or safety), in the domain of feeds of variable frequency of alternating current rotating machines (asynchronous motors, etc.), or further as intermediate converter of average frequency of an assembly of continuous/continuous conversion (battery charger, soldering iron, high voltage generator).

We claim:

1. Static semiconductor electrical energy converter, comprising:

a power stage comprising at least one power transistor having a collector, base and emitter, and a commutation assistance circuit for steering its collector current in the course of blocking commutations of the said transistor;

a control stage adapted to generate for each power transistor, a control signal $S_C$ in the form of a pulse train having a repetition frequency proportional to the desired output voltage;

each power transistor being a transistor having a voltage $V_{CEX}$ (collector-emitter voltage at a null collector current and base negatively biased) greater than its voltage $V_{CEO}$ collector emitter voltage (base open);

a signal processing stage associated with each power transistor and having two inputs, the signal $S_C$ being applied to one input and the collector/emitter voltage $V_{CE}$ of the power transistor being applied at all time to the other input, the output of the signal processing stage being connected to said power stage to trigger the commutations of the power transistor, the signal processing stage being adapted to drive the base of the said power transistor in a fashion so as to render the transistor conductive in the single case where, simultaneously, the control signal $S_C$ has a value corresponding to an initiation of conduction of the transistor and the voltage $V_{CE}$ of the said transistor is adjacent to zero;

and to assure reverse biasing of the base of said each power transistor in all other cases in order to exploit the voltage $V_{CEX}$.

2. Converter according to claim 1 wherein each signal processing stage associated with a power transistor comprises:

a circuit $M_V$ for shaping the voltage $V_{CE}$ of the said transistor and adapted to furnish a signal in either of two states, one when the voltage $V_{CE}$ is adjacent to zero, the other when it is a different voltage, a circuit $M_C$ for shaping the control signal $S_C$ and adapted to furnish a signal in either of two states, one of which places said at least one power transistor into conduction, and the other of which blocks the control signal;

a logic gate connected to the outputs of the two circuits $M_C$ and $M_V$ referred to above, and adapted to perform an AND function with respect to the signals issuing from the circuits so as to furnish a logic commutation signal having two states; and an adaptation circuit A connected to the AND logic gate and to the base of the power transistor, this adaptation circuit being adapted to furnish a feed current of the said base as a function of the signal issuing from the AND logic gate.

3. Converter according to claim 2, wherein each $M_V$ circuit compirses feed means furnishing a very low reference voltage with respect to the emitter of the corresponding power transistor and a comparator element connected to said feed means and to the collector of the power transistor.

4. Converter according to claim 3, wherein the AND logic unit comprises a diode connected to the output of the corresponding circuits $M_C$ and $M_V$ and to the corresponding adaptation circuit A, and connected to steer towards the circuit $M_C$ the current issuing from the circuit $M_C$ for one of the to states of the circuit $M_C$ and to deliver this current towards the adaptation circuit A for the other state of the circuit $M_C$.

5. Converter according to claim 2 wherein the adaptation circuit A comprises:
bias means furnishing a positive and a negative voltage;
a self-regulating assembly comprising a ballast component receiving the positive bias voltage, and a diode associated with the ballast component and connected to said power transistor collector so as to cancel the base current of the said transistor when its collector/base voltage $V_{CB}$ becomes negative; and
a negative polarization diode, connected between the base of said power transistor and the negative bias voltage to assure a negative polarization of the base of said power transistor during the blockage periods of the said power transistor.

6. Converter according to any one of claims 1, 2, 3, 4 or 5 in which the control stage includes an isolating transformer for furnishing the control signal $S_C$ in the form of pulses to the circuit $M_C$, the said converter being characterized in that circuit $M_C$ is a bi-stable circuit, adapted to switch from one state to the other under the effect of each pulse of the signal $S_C$.

7. Converter according to any one of claims 1, 2, 3, 4 or 5, wherein each power transistor is a "reverse-Mesa" transistor.

8. Converter according to any one of claims 1, 2, 3, 4 or 5, wherein the commutation assistance circuit associated with each power transistor, is constituted by a capacitor connected in parallel across the collector and emitter of the said power transistor so as to steer the collector current thereof in the course of blocking commutations.

9. Converter according to any one of claims 1, 2, 3, 4 or 5, adapted to convert a continous electric voltage into an alternating electric voltage of predetermined frequency F, in which the control stage is adapted to cause for each power transistor a control signal $S_C$ having an alternating frequency equal to F.

* * * * *